United States Patent
Okayama et al.

(10) Patent No.: US 6,306,227 B2
(45) Date of Patent: *Oct. 23, 2001

(54) ROLLING BEARING

(75) Inventors: Akio Okayama; Hiroshi Murakami; Kikuo Maeda, all of Kuwana; Takuya Atsumi; Toshiyuki Hoshino, Kurashiki; Keniti Amano, Kurashiki, all of (JP)

(73) Assignees: NTN Corporation, Osaka; Kawasaki Steel Corporation, Hyogo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,637

(22) Filed: Dec. 13, 1999

(30) Foreign Application Priority Data

Dec. 25, 1998 (JP) .................................................. 10-370354

(51) Int. Cl.⁷ ............................... C23C 8/22; C22C 38/32
(52) U.S. Cl. ........................... 148/319; 148/233; 148/225
(58) Field of Search ...................................... 148/319, 233, 148/225

(56) References Cited

U.S. PATENT DOCUMENTS

| | | | |
|---|---|---|---|
| 2,207,289 | * 7/1940 | Fleischmann | 148/21.5 |
| 4,004,952 | * 1/1977 | Jatczak et al. | 148/39 |
| 4,157,258 | * 6/1979 | Philip et al. | 75/124 |
| 4,696,581 | * 9/1987 | Tsushima et al. | 384/565 |
| 4,913,749 | * 4/1990 | Hengerer et al. | 148/16 S |
| 4,930,909 | * 6/1990 | Murakami et al. | 384/492 |
| 5,002,729 | * 3/1991 | Wert et al. | 420/38 |
| 5,385,412 | * 1/1995 | Yatabe et al. | 384/492 |
| 5,853,502 | * 12/1998 | Alhara et al. | 148/319 |
| 5,910,223 | * 6/1999 | Tipton et al. | 148/210 |
| 5,997,661 | * 12/1999 | Matsummoto et al. | 148/316 |
| 6,101,719 | * 8/2000 | Kiuchi et al. | 29/898.13 |

FOREIGN PATENT DOCUMENTS 62-132031 6/1987 (JP) .

* cited by examiner

Primary Examiner—Roy King
Assistant Examiner—Nicole Coy
(74) Attorney, Agent, or Firm—McDermott, Will & Emery

(57) ABSTRACT

In a rolling bearing having a rolling bearing ring and a rolling element of at least 20 mm in diameter, at least one of the rolling bearing ring and the rolling element consists of carburized or carbonitrided steel containing at least 0.2 wt % and not more than 0.35 wt % of carbon and at least 2.2 wt % and not more than 3.6 wt % of Ni. Thus obtained is a rolling bearing capable of reducing the material cost and increasing the fatigue life or reducing the carburizing time by ensuring surface hardness and optimizing the case depth.

7 Claims, 4 Drawing Sheets

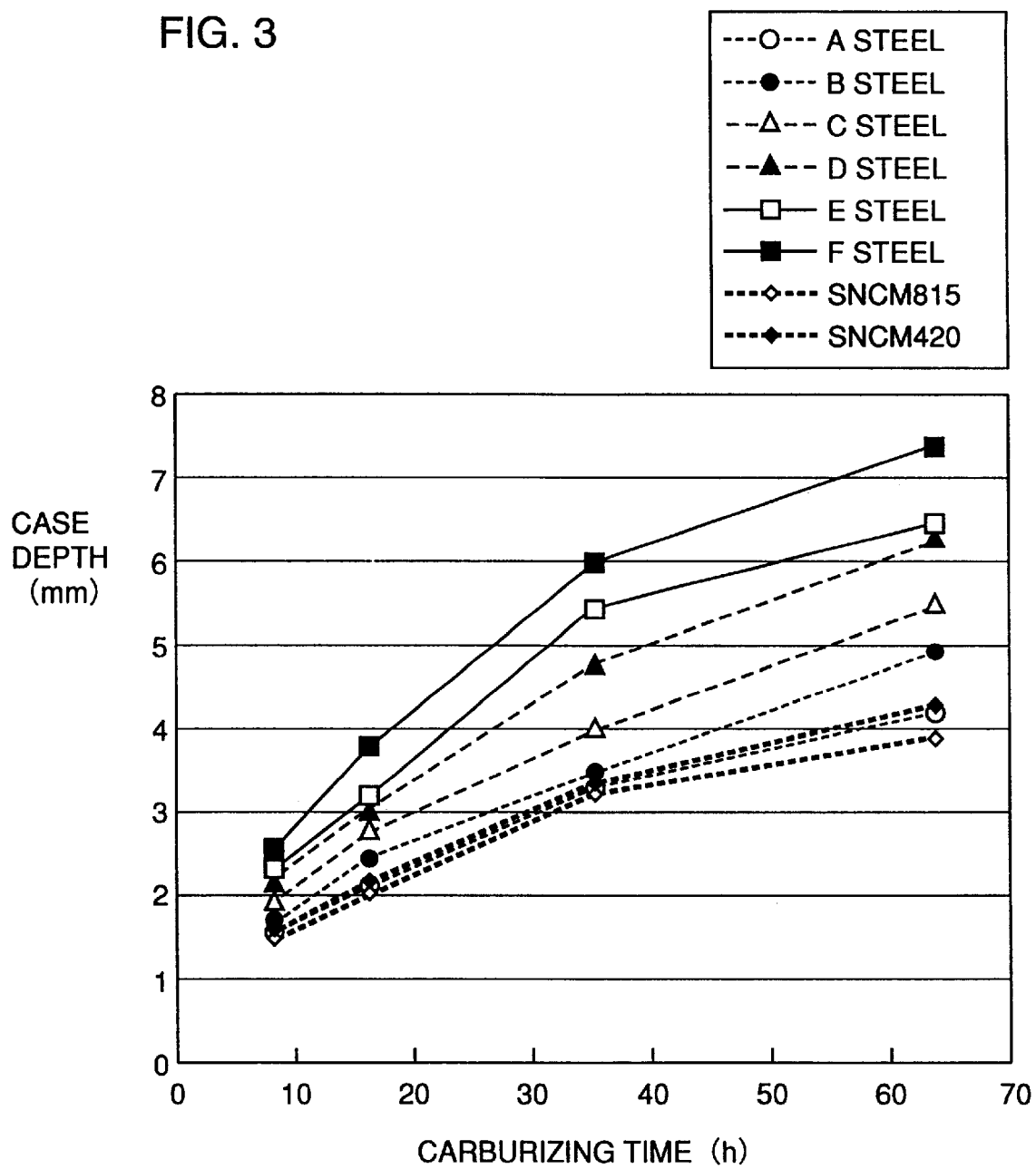

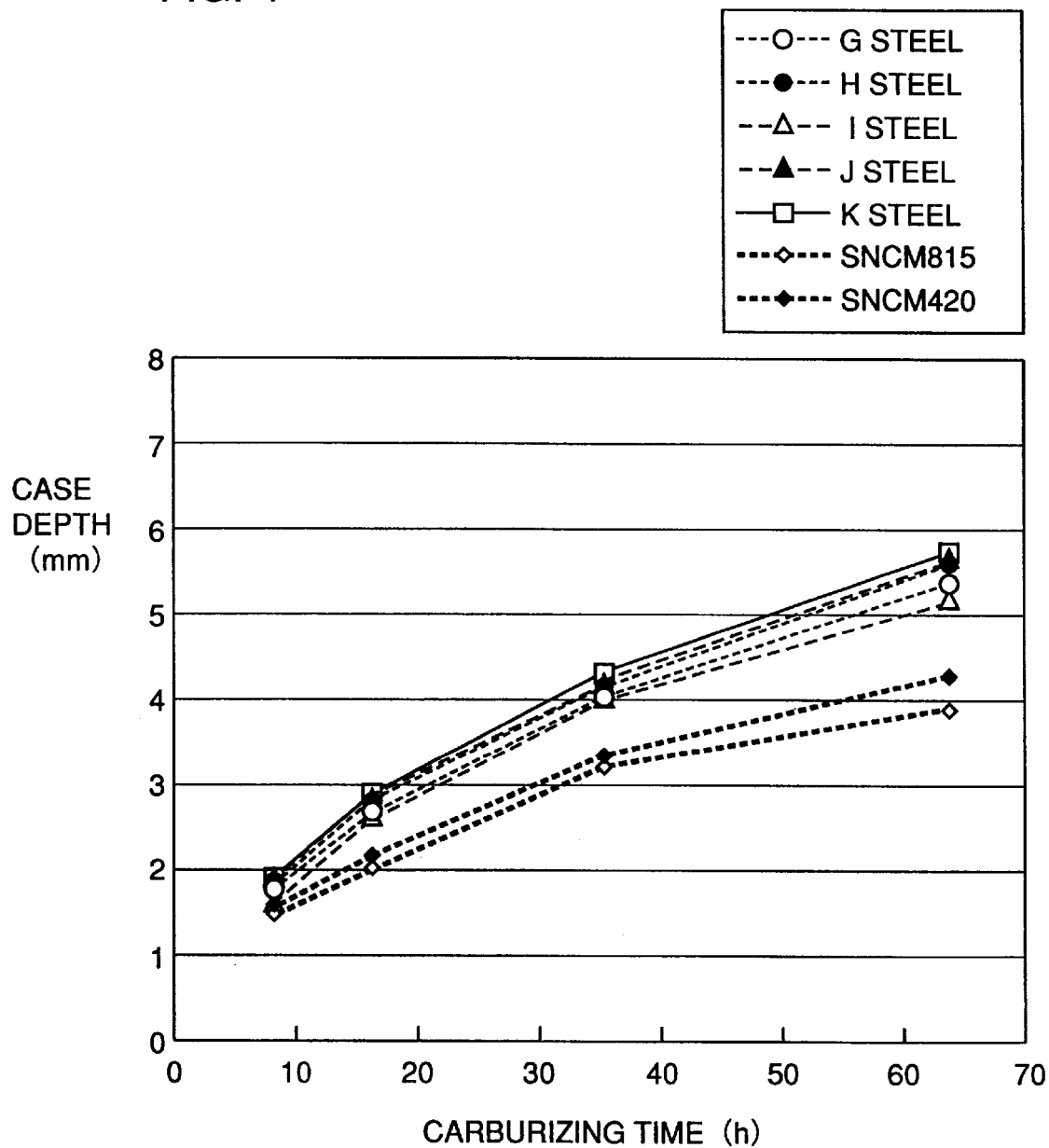

ROLLING BEARING

BACKGROUND OF THE INVENTION

1. Field of the Invention

The present invention relates to a rolling bearing, and more particularly, it relates to a large-sized rolling bearing such as a bearing, which an average diameter of a rolling element is at least 20 mm, for a rolling mill in the steel industry.

2. Description of the Prior Art

In general, the material for a large-sized thick bearing employed in the steel industry or the like is prepared by carburized material such as SNCM815 having a large content of alloying element, in order to ensure required case depth and toughness. With SNCM 815 having a large content of Ni and requiring a high material cost, however, surface hardness is hard to attain in carburizing and a long time is required for carburizing, to disadvantageously result in a high cost for the rolling bearing and dispersion of the rolling contact fatigue life.

If the content of the alloying element is small, on the other hand, hardenability is so lowered that required hardness distribution (case depth) or core hardness cannot be obtained although the material cost is reduced.

SUMMARY OF THE INVENTION

An object of the present invention is to provide a rolling bearing capable of reducing the material cost and increasing the life or reducing the carburizing time by ensuring surface hardness and optimizing the case depth.

The inventors have made deep study to find out that the material cost can be reduced by reducing the content of Ni (nickel) and increasing the content of C (carbon) for the composition of SNCM 815 and a material for a rolling bearing having a long life and fracture strength comparable to that of the prior art can be obtained by controlling surface hardness and core hardness to proper values through proper carburizing. It has also been proved that reduction of toughness resulting from the increase of the C content can be suppressed mainly by low-order regulation of specific unavoidable impurities.

1) Accordingly, the inventive rolling bearing has a rolling bearing ring and a rolling element, and the diameter of the rolling element is at least 20 mm while at least one of the rolling bearing ring and the rolling element consists of carburized or carbonitrided steel containing at least 0.2 percent by weight (wt %) and not more than 0.35 wt % of C and at least 2.2 wt % and not more than 3.6 wt % of Ni.

In the inventive rolling bearing, the Ni content is reduced as compared with SNCM 815 while the C content is increased, whereby the material cost can be reduced and the case depth can be increased as compared with SNCM 815 through the same carburizing. If the inventive rolling bearing has the same case depth as SNCM 815, the carburization time can be reduced as compared with SNCM 815.

The C content is set in the range of at least 0.2 wt % and not more than 0.35 wt % since required core hardness for ensuring core strength cannot be ensured if the C content is less than 0.2 wt % while forgeability and machinability are deteriorated and core toughness specific to carburized steel cannot be ensured if the C content exceeds 0.35 wt %. If the Ni content is less than 2.2 wt %, core toughness as well as hardenability are reduced. If the content of high-priced Ni exceeds 3.6 wt %, the cost for the rolling bearing cannot be reduced while heat treatment such as process annealing is required. Therefore, the upper limit for the Ni content is 3.6 wt %.

2) The aforementioned rolling bearing preferably contains at least 0.7 wt % and not more than 0.9 wt % of Cr (chromium), at least 0.2 wt % and not more than 0.25 wt % of Mo (molybdenum) and not more than 0.015 wt % of P (phosphorus).

The content of Cr, which is a high-priced chemical component, is preferably increased for forming a carbide and attaining heat resistance. The effects of forming a carbide and attaining heat resistance are reduced if the Cr content is small, and hence the lower limit for the Cr content is 0.7 wt %. If the Cr content is excessive, however, the cost for the rolling bearing is increased. Therefore, the upper limit for the Cr content is 0.9 wt %.

Mo is a carbide forming element by coexisting with Cr, improving temper resistance and increasing the life of the rolling bearing. The life of the rolling bearing is reduced if the Mo content is too small, and hence the lower limit for the Mo content is 0.2 wt %. The cost for the rolling bearing is excessively increased if the Mo content is excessive, and hence the upper limit for the Mo content is 0.25 wt %.

In order to suppress increase of core hardness or reduction of core toughness resulting from the increase of the C content and the reduction of the Ni content, the content of P exerting bad influence on toughness is controlled to not more than 0.015 wt %.

3) In the aforementioned rolling bearing, the steel preferably contains at least 0.25 wt % and not more than 0.35 wt % of C and at least 2.2 wt % and not more than 2.9 wt % of Ni.

Thus, the material cost can be reduced by reducing the Ni content, while required core hardness for ensuring core strength can be readily ensured by increasing the C content.

4) In the aforementioned rolling bearing, the steel preferably contains at least 0.25 wt % and not more than 0.30 wt % of C, at least 2.2 wt % and not more than 2.9 wt % of Ni, at least 0.7 wt % and not more than 0.9 wt % of Cr, at least 0.2 wt % and not more than 0.25 wt % of Mo, at least 0.15 wt % and not more than 0.4 wt % of Si (silicon), at least 0.3 wt % and not more than 2.0 wt % of Mn (manganese), at least 0.001 wt % and not more than 0.01 wt % of Ti (titanium), at least 0.001 wt % and not more than 0.005 wt % of N (nitrogen), not more than 0.015 wt % of P, not more than 0.05 wt % of Cu (copper), not more than 0.01 wt % of Nb (niobium) and not more than 0.01 wt % of V (vanadium).

When high core toughness and high rolling contact fatigue life are necessary, the chemical composition must be limited mainly by small amount regulation of specific impurity elements in particular. In other words, reduction of the contents of unavoidable impurity elements compensates for reduction of toughness resulting from the increase of the C content. Further, the rolling contact fatigue life is improved due to reduction of the contents of the elements leading to fatigue failure. The reasons for limiting the chemical composition are as follows:

Si: 0.15 to 0.4 wt %.

Si is necessary as a deoxidizing element when ingoting the steel. Therefore, Si must be added by at least 0.15 wt %, while Si reduces toughness or prompts boundary oxidation to readily form an origin point of fracture if excessively added and hence the upper limit for the Si content is set to 0.4 wt %.

Mn: 0.3 to 2.0 wt %.

Mn is necessary as a deoxidizing and desulfurizing element when ingoting the steel. Further, Mn is necessary for providing prescribed core hardness to a carburized/hardened part and increasing an effective case depth as an element improving hardenability and increasing the strength of the core part. Therefore, Mn must be added by at least 0.3 wt %. If Mn is excessively added, however, hardenability is excessively increased to reduce toughness and deteriorate machinability and cold workability, and hence the upper limit for the Mn content is set to 2.0 wt %.

P: not more than 0.015 wt %, Cu: not more than 0.05 wt %, Nb: not more than 0.01 wt %, V: not more than 0.01 wt %.

P, Cu, Nb and V are harmful elements reducing toughness and causing fatigue failure when employed as the materials for the rolling element. In relation to the present invention, it has been recognized effective to regulate these elements to small amount in particular. Excellent toughness and rolling contact fatigue life can be attained by setting the upper limits for the contents of P, Cu, Nb and V to 0.015 wt %, 0.05 wt %, 0.01 wt % and 0.01 wt % respectively.

Ti: 0.001 to 0.01 wt %.

Ti is an element suppressing austenite grain growth in carburizing. Ti must be added by at least 0.001 wt % in order to attain this effect, while toughness and rolling contact fatigue life are reduced if Ti is excessively added. Thus, the upper limit for the Ti content is set to 0.01 wt %.

N: 0.001 to 0.005 wt %.

N combines with the aforementioned Ti to refine grains as TiN. The inventive rolling bearing must contain N by at least 0.001 wt %, in order to attain this effect. If the N content exceeds 0.005 wt %, however, toughness and rolling contact fatigue life are reduced by a Ti inclusion. Thus, the upper limit for the N content is set to 0.005 wt %.

5) Preferably, core hardness of the aforementioned rolling bearing is at least HV 450 and not more than HV 550.

Compressive stress on a surface layer effective for the rolling contact life is reduced or toughness is so reduced that the rolling bearing is sensitive to cracking if the core hardness is excessive, while the rolling bearing may be internally plastically deformed if the core hardness is insufficient. As to the proper range for the core hardness, it has been proved from the results of rolling contact life tests made by the assignee of the present invention (based on the recognition in Japanese Patent Laying-Open No. 62-132031 (1987)) that the preferable range is HRC 48 to HRC 58 (HV 480 to HV 650) in relation to the rolling contact life. In consideration of an impact or a large load acting on the core hardness through a rolling mill, the core hardness is preferably at least HV 450 and not more than HV 550, in order to ensure toughness by reducing hardness to such a degree that the rolling bearing is not internally plastically deformed.

HVα represents that the Vickers Hardness of 300 g test weight is α.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates changes of HV 550 hardening depths (case depths) of steels A to F after various carburization times; and FIG. 4 illustrates changes of HV 550 hardening depths (case depths) of steels G to K after various carburization times.

DESCRIPTION OF THE PREFERRED EMBODIMENTS

Figure 1:
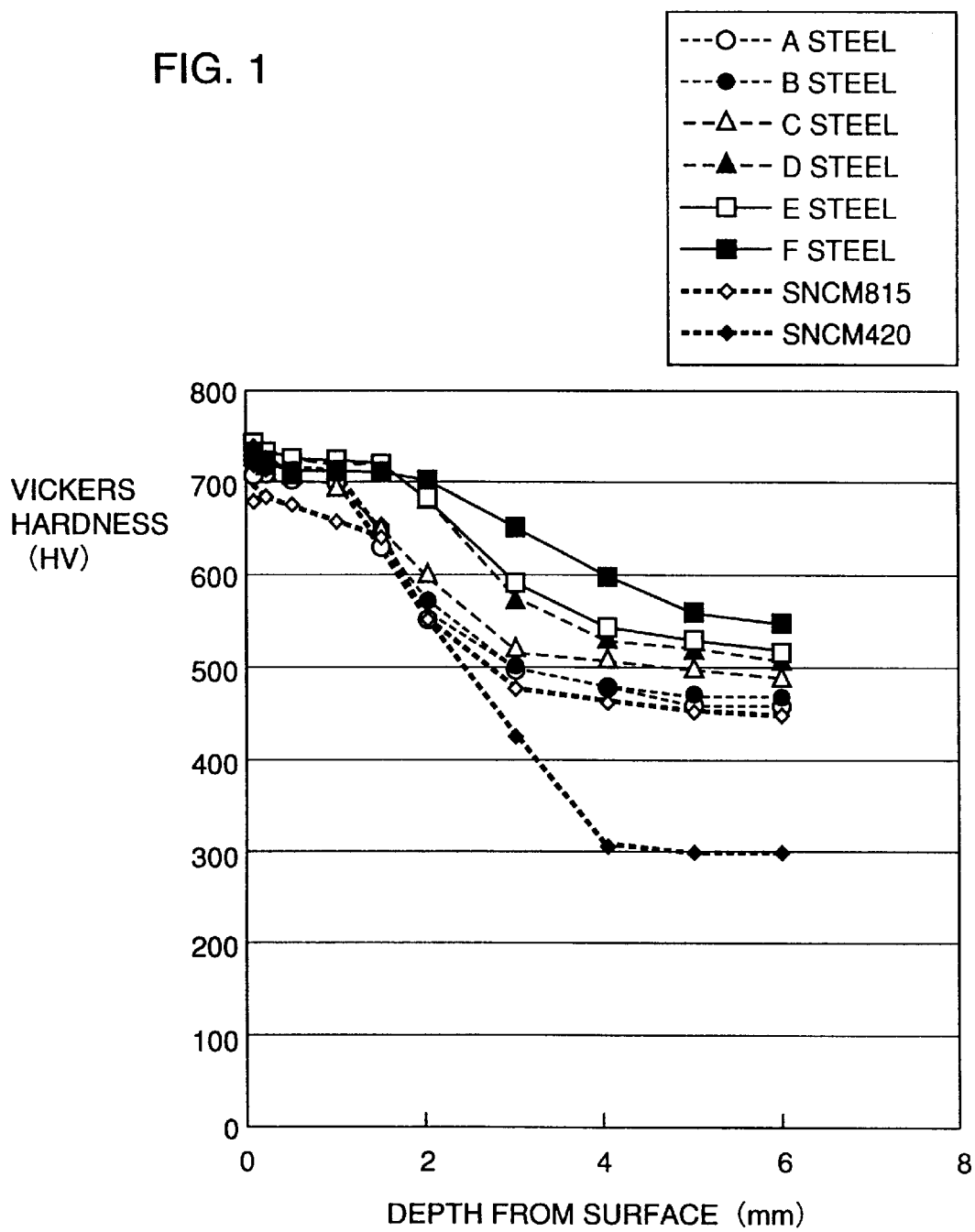
FIG. 1 illustrates cross sectional hardness distribution of steels A to F carburized for 16 hours.

Examples of the present invention are now described.

Table 1 shows the chemical components of 11 developed steels A to K and two comparative steels (SNCM 815 and SNCM 420 under JIS) tested in relation to the present invention. The developed steels were mainly prepared by varying the contents of Ni and C in the chemical components of the two comparative steels while compensating for reduction of hardenability resulting from reduction of the Ni contents by increasing the C contents. Reduction of core toughness resulting from increase of the C contents was compensated mainly by small amount regulation of impurity elements.

TABLE 1

Chemical composition of Material (wt %, *: PPM, material diameter φ65 mm)

| | | C | Si | Mn | P | S | Ni | Cr | Mo | Ti | N | Cu | Nb | V | DI Value* |
|---|---|---|---|---|---|---|---|---|---|---|---|---|---|---|---|
| Developed Steel | Steel A | 0.22 | 0.27 | 0.55 | 0.012 | 0.014 | 3.59 | 0.69 | 0.23 | 0.010 | 0.0070 | 0.11 | 0.010 | 0.012 | 210 |
| | Steel B | 0.23 | 0.25 | 0.55 | 0.012 | 0.015 | 2.72 | 0.86 | 0.2.3 | 0.020 | 0.0075 | 0.07 | 0.015 | 0.015 | 204 |
| | Steel C | 0.28 | 0.25 | 0.55 | 0.013 | 0.013 | 2.70 | 0.75 | 0.23 | 0.010 | 0.0051 | 0.06 | 0.001 | 0.001 | 205 |
| | Steel D | 0.30 | 0.25 | 0.55 | 0.013 | 0.013 | 2.21 | 0.86 | 0.23 | 0.010 | 0.0045 | 0.08 | 0.013 | 0.012 | 209 |
| | Steel E | 0.30 | 0.25 | 0.55 | 0.012 | 0.013 | 2.55 | 0.75 | 0.24 | 0.010 | 0.0061 | 0.09 | 0.001 | 0.001 | 210 |
| | Steel F | 0.35 | 0.25 | 0.55 | 0.013 | 0.013 | 2.68 | 0.89 | 0.22 | 0.010 | 0.0057 | 0.11 | 0.015 | 0.015 | 254 |
| | Steel G | 0.28 | 0.25 | 0.55 | 0.013 | 0.014 | 2.65 | 0.80 | 0.23 | 0.002 | 0.0030 | 0.01 | 0.001 | 0.001 | 209 |
| | Steel H | 0.26 | 0.25 | 0.55 | 0.012 | 0.013 | 2.68 | 0.83 | 0.22 | 0.001 | 0.0022 | 0.03 | 0.001 | 0.001 | 204 |
| | Steel I | 0.28 | 0.25 | 0.55 | 0.012 | 0.014 | 2.69 | 0.74 | 0.24 | 0.003 | 0.0018 | 0.01 | 0.001 | 0.001 | 203 |
| | Steel J | 0.26 | 0.25 | 0.55 | 0.013 | 0.014 | 2.69 | 0.78 | 0.24 | 0.003 | 0.0025 | 0.02 | 0.001 | 0.001 | 204 |
| | Steel K | 0.26 | 0.25 | 0.55 | 0.013 | 0.014 | 2.67 | 0.85 | 0.23 | 0.001 | 0.0035 | 0.01 | 0.001 | 0.001 | 210 |
| Comparative Steel | SNCM 815 | 0.15 | 0.25 | 0.45 | 0.020 | 0.014 | 4.26 | 0.88 | 0.23 | 0.010 | 0.0095 | 0.15 | 0.020 | 0.015 | 203 |
| | SNCM 420 | 0.21 | 0.25 | 0.54 | 0.020 | 0.014 | 1.83 | 0.54 | 0.23 | 0.010 | 0.0093 | 0.15 | 0.015 | 0.015 | 122 |

*calculated as grain size No. 7

While Table 1 shows critical quench diameters DI estimated from the chemical components, it is understood that the developed steels are equivalent or superior to SNCM 815 in hardenability and can be regarded as materials close to SNCM 815 in view of internal characteristics (structure and hardness).

The developed and comparative steels shown in Table 1 were subjected to evaluation of carburizing rate and tests related to rolling contact fatigue life and fracture strength. The carburizing rate was evaluated on rolling element test pieces of 25 mm in diameter with various carburizing times. The rolling contact fatigue life was evaluated on φ60×L90 large cylindrical test pieces postulating large bearings and standard φ12 cylindrical test pieces under standard life test conditions (Tables 2 and 3). Fracture strength was evaluated on rings of 60 mm in outer diameter, 45 mm in inner diameter and 15 mm in width.

TABLE 2

Test Conditions for φ60 Test Piece

| Tester | Large Point Contact Life Tester |
|---|---|
| Test Shape | φ60 × L90 Cylinder |
| Counterpart Steel Ball | φ25.4 (1") |
| Contact Stress | 5.88 (GPa) |
| Loading Speed | 6610 (cpm) |
| Lubrication | Turbine 68 Splash Lubrication |

TABLE 3

Test Conditions for φ12 Test Piece

| Tester | Point Contact Life Tester |
|---|---|
| Test Shape | φ12 × L22 Cylinder |
| Counterpart Steel Ball | φ19.05 (¾") |
| Contact Stress | 5.88 (GPa) |
| Loading Speed | 46240 (cpm) |
| Lubrication | Turbine 68 Splash Lubrication |

The test pieces were prepared by carburizing the steels shown in Table 1 at 960° C. under various holding times and performing secondary quenching from 770 to 820° C. for controlling surface hardness and core hardness to prescribed values. Carbon potentials in carburizing/diffusion were set to 1.5 to 1.2.

Figure 2:
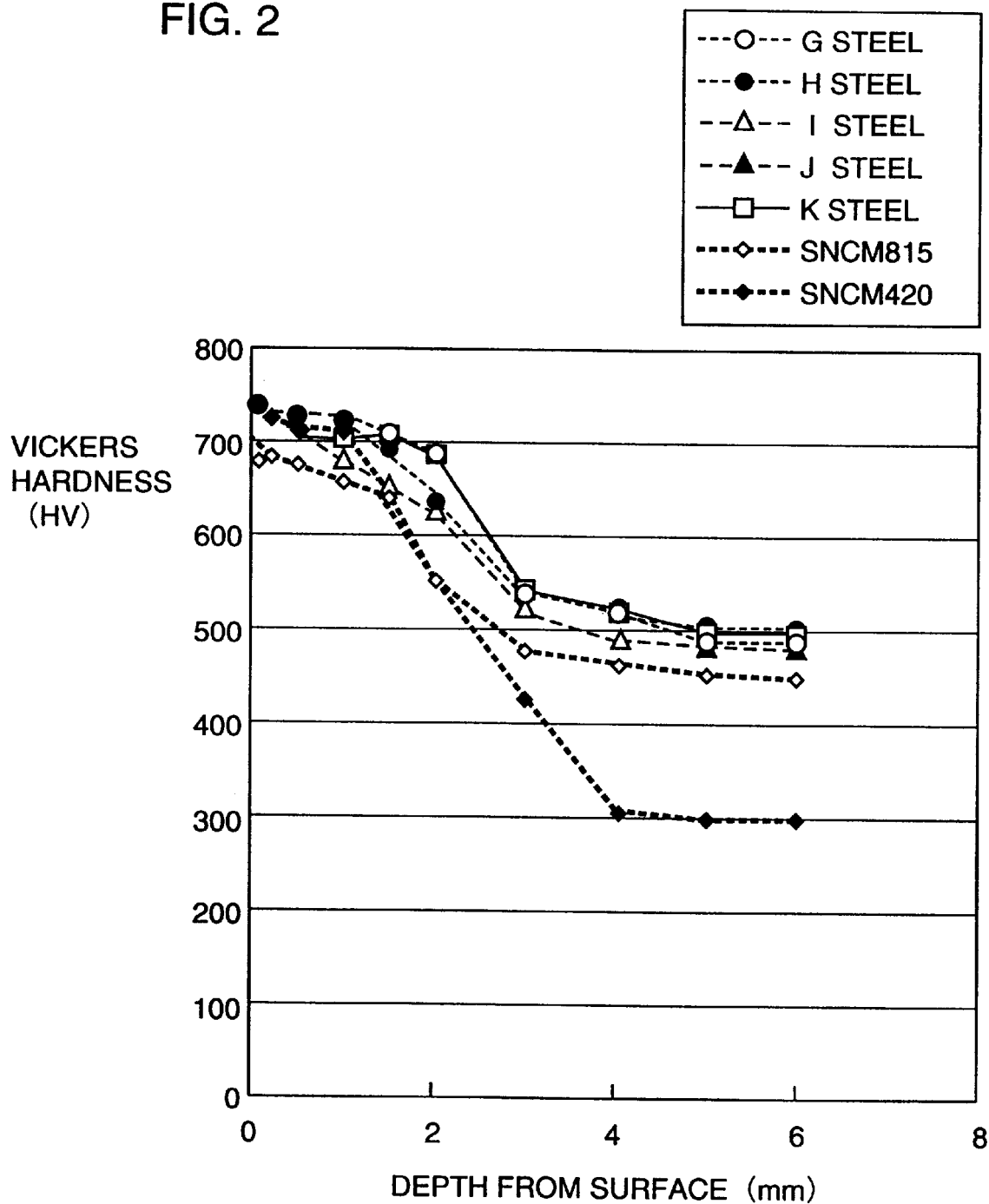
FIG. 2 illustrates cross sectional hardness distribution of steels G to K carburized for 16 hours.

While surface hardness and case depth up to HRC 58 (HV 650) generally influence the rolling contact fatigue life of a bearing such that the bearing has a longer life as the surface hardness and the case depth are increased, it has been proved that all developed steels have higher surface hardness (carburized parts) than SNCM 815 and larger depths up to HRC 58 (HV 650) than comparative steels, as shown in FIGS. 1 and 2. It has also been proved that the developed steels are equivalent to or slightly higher than SNCM 815 in core strength and higher than SNCM 420 in hardness.

While the developed steels have larger case depths than SNCM 815 and SNCM 420 through the same carburizing times, it has been proved that nine developed steels C, D, E, F, G, H, I, J and K are particularly excellent in rapid carburizability among the developed steels A to K, as shown in FIGS. 3 and 4.

While Table 4 shows the ratios of case depths with reference to SNCM 815, the case depths of these nine developed steels C, D, E, F, G, H, I, J and K are 1.3 to 1.9 times that of SNCM 8158. It follows that the same case depth can be attained in a time of about 60 to 30% in terms of the carburizing time.

TABLE 4

Case Depth (HV550 Depth) and Ratio of Each Steel through the Same Carburizing Time

| Object | | Carburizing Time 16 h | | Carburizing Time 3.5 h | | Core Hardness (HV) |
|---|---|---|---|---|---|---|
| | | Case Depth (mm) | Ratio | Case depth (mm) | Ratio | |
| Developed Steel | Steel A | 2.1 | 1.1 | 3.3 | 1.0 | 460 |
| | Steel B | 2.5 | 1.3 | 3.5 | 1.1 | 470 |
| | Steel C | 2.8 | 1.4 | 4.0 | 1.3 | 490 |
| | Steel D | 3.1 | 1.6 | 4.8 | 1.5 | 510 |
| | Steel E | 3.2 | 1.6 | 5.5 | 1.7 | 520 |
| | Steel F | 3.8 | 1.9 | 6.0 | 1.9 | 540 |
| | Steel G | 2.7 | 1.4 | 4.0 | 1.3 | 490 |
| | Steel H | 2.8 | 1.4 | 4.2 | 1.3 | 490 |
| | Steel I | 2.6 | 1.3 | 4.0 | 1.3 | 490 |
| | Steel J | 2.8 | 1.4 | 4.2 | 1.3 | 490 |
| | Steel K | 2.9 | 1.5 | 4.4 | 1.4 | 500 |
| Comparative Steel | SNCM 815 | 2.0 | 1.0 | 3.2 | 1.0 | 450 |
| | SNCM 420 | 2.2 | 1.1 | 3.3 | 1.0 | 300 |

From the above results, it is understood that each developed steel can attain hardness distribution equivalent to that of each comparative steel in a shorter carburizing time and the case depth of the developed steel can be increased through the same carburizing time as the comparative steel.

Table 5 shows rolling contact fatigue lives of the test pieces of the respective steels, and Table 6 shows fracture (fatigue and static) strength. The carburizing time was so varied that the test pieces attained substantially identical hardness distribution on surface layers. The ratios of high case depths exceeding HV 650 to thicknesses were set to 0.1 to 0.15 in the respective test pieces, and the core hardness was set to HV 460 to HV 540. It has been proved from Table 5 that particularly the steels C to K are equivalent or superior to the comparative steels in life and exhibited stable rolling contact fatigue lives. These steels C to K have core hardness of at least HV 490, and such a tendency has been proved that the rolling contact fatigue life and the fracture strength are improved as the core hardness is improved.

Each developed steel has higher carburizing rate than each comparative steel. When the developed and comparative steels are carburized to have the same surface hardness distribution, the developed steel attains higher core hardness than the comparative steel and is thereby improved in life.

Table 5 also shows data obtained by carbonitriding the test pieces of the respective steels. While the life is further improved by carbonitriding, it has been proved that the developed steels exhibiting larger fatigue life improvement than the comparative steels are suitable also to carbonitriding. It has also been proved that the steels C to K have high ring rotation fracture fatigue strength as shown in Table 6. As to ring static fracture strength, substantially no difference was observed between the developed steels and SNCM 815.

TABLE 5

Results of Rolling contact fatigue life Test (Carburizing and Carbonitriding)

| | | φ60 Test Piece | | φ12 Test Piece | |
|---|---|---|---|---|---|
| Object | Steel Type | 10% Life (Hour) | Life Ratio | 10% Life (Hour) | Life Ratio |
| Developed | Steel A | 2020 | 1.3 | 9250 | 1.5 |
| Steel | Steel B | 1990 | 1.3 | 10320 | 1.7 |
| (Carburized) | Steel C | 2545 | 1.7 | 16200 | 2.6 |
| | Steel D | 1970 | 1.3 | 14400 | 2.3 |
| | Steel E | 2320 | 1.5 | 13200 | 2.1 |
| | Steel F | 2090 | 1.4 | 10500 | 1.7 |
| | Steel G | 2160 | 1.4 | 12500 | 2.0 |
| | Steel H | 2160 | 1.4 | 12400 | 2.0 |
| | Steel I | 2170 | 1.4 | 12600 | 2.0 |
| | Steel J | 2160 | 1.4 | 12400 | 2.0 |
| | Steel K | 2150 | 1.4 | 12300 | 2.0 |
| Comparative | SNCM815 | 1540 | 1.0 | 6220 | 1.0 |
| Steel | SNCM420 | 1920 | 1.2 | 9690 | 1.6 |
| (Carburized) | | | | | |
| Developed | Steel A | 6490 | 1.3 | 20300 | 1.2 |
| Steel | Steel B | 6590 | 1.3 | 21500 | 1.3 |
| (Carbonitrided) | Steel C | 7820 | 1.6 | 27000 | 1.6 |
| | Steel D | 7010 | 1.4 | 25200 | 1.5 |
| | Steel E | 8050 | 1.6 | 22000 | 1.3 |
| | Steel F | 6570 | 1.3 | 20500 | 1.2 |
| | Steel G | 7080 | 1.4 | 23100 | 1.4 |
| | Steel H | 7060 | 1.4 | 23000 | 1.4 |
| | Steel I | 7100 | 1.4 | 23300 | 1.4 |
| | Steel J | 7060 | 1.4 | 23000 | 1.4 |
| | Steel K | 7040 | 1.4 | 22700 | 1.4 |
| Comparative | SNCM815 | 4990 | 1.0 | 16600 | 1.0 |
| Steel | SNCM420 | 5060 | 1.0 | 15400 | 0.9 |
| (Carbonitrided) | | | | | |

TABLE 6

Results of Fracture Strength Test (Carburizing and Carbonitriding)

| | | Rotation Fracture Fatigue Strength of Ring | | | Static Fracture Strength of Ring | | |
|---|---|---|---|---|---|---|---|
| Object | Steel Type | n | Average Life (h) | Life Ratio | n | Fracture Strength (kN) | Strength Ratio |
| Developed | Steel A | 2 Each | 35 | 1.1 | 2 Each | 48.5 | 1.1 |
| Steel | Steel B | | 39 | 1.2 | | 48.8 | 1.1 |
| (Carburized) | Steel C | | 45 | 1.4 | | 51.0 | 1.2 |
| | Steel D | | 53 | 1.6 | | 50.8 | 1.2 |
| | Steel E | | 52 | 1.6 | | 52.3 | 1.2 |
| | Steel F | | 62 | 1.9 | | 53.6 | 1.2 |
| | Steel G | | 44 | 1.3 | | 50.2 | 1.2 |
| | Steel H | | 45 | 1.4 | | 50.5 | 1.2 |
| | Steel I | | 42 | 1.3 | | 49.9 | 1.2 |
| | Steel J | | 45 | 1.4 | | 50.5 | 1.2 |
| | Steel K | | 48 | 1.5 | | 50.9 | 1.2 |
| Comparative Steel | SNCM815 | 2 | 33 | 1.0 | 2 | 43.1 | 1.0 |
| Developed | Steel A | 2 Each | 68 | 1.4 (1.9) | 2 Each | 46.5 | 1.1 |
| Steel | Steel B | | 75 | 1.5 (1.9) | | 46.2 | 1.1 |
| (Carbonitrided) | Steel C | | 87 | 1.7 (1.9) | | 47.5 | 1.2 |
| | Steel D | | 89 | 1.8 (1.7) | | 48.5 | 1.2 |
| | Steel E | | 95 | 1.9 (1.8) | | 49.5 | 1.2 |
| | Steel F | | 98 | 2.0 (1.6) | | 49.8 | 1.2 |
| | Steel G | | 82 | 1.6 (1.9) | | 47.6 | 1.2 |
| | Steel H | | 83 | 1.7 (1.8) | | 47.7 | 1.2 |
| | Steel I | | 80 | 1.6 (1.9) | | 47.3 | 1.1 |
| | Steel J | | 83 | 1.7 (1.8) | | 47.7 | 1.2 |
| | Steel K | | 85 | 1.7 (1.8) | | 48.0 | 1.2 |
| Comparative Steel | SNCM815 | 2 | 50 | 1.0 (1.5) | 2 | 41.3 | 1.0 |

( ): Life Improvement Ratio of the Same Steel by Carbonitriding

Table 7 shows core toughness values after carburizing (at 960° C. for 34 hours). It is understood that particularly the steels G to K prepared by regulating specific impurity elements to small amount have toughness values equivalent or superior to those of the comparative steels.

TABLE 7

Results of Charpy Test

| | | | Charpy Test | |
|---|---|---|---|---|
| Object | Steel Type | n | Absorbed Energy (J/cm$^2$) | Ratio |
| Carburization 960° C. × 34h | | | | |
| Developed | Steel A | 3 Each | 6.9 | 1.0 |
| Steel | Steel B | | 6.9 | 1.0 |
| | Steel C | | 6.8 | 1.0 |
| | Steel D | | 6.8 | 1.0 |
| | Steel E | | 6.7 | 1.0 |
| | Steel F | | 6.6 | 1.0 |
| | Steel G | | 9.3 | 1.3 |
| | Steel H | | 10.0 | 1.4 |
| | Steel I | | 8.9 | 1.3 |
| | Steel J | | 11.3 | 1.6 |
| | Steel K | | 11.2 | 1.6 |
| Comparative Steel | SNCM815 | 3 | 6.9 | 1.0 |

As clearly understood from the above description, the inventive rolling bearing can reduce the material cost by reducing the Ni content and increasing the C content while ensuring surface hardness and increasing the fatigue life or reducing the carburizing time by ensuring surface hardness and optimizing the case depth. Further, productivity can be improved by reducing the carburizing time, the fatigue life can be increased by stabilizing surface hardness and improving the hardness, crack strength can be improved by optimizing the core hardness, and the fatigue life as well as the strength can be improved by combination with carbonitriding.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rolling bearing having a rolling bearing ring and a rolling element, wherein the diameter of said rolling element is at least 20 mm and at least one of said rolling bearing ring and said rolling element consists of carburized or carbonitrided steel consisting essentially of Fe, Cr, Mo, Si, Mn, Ti, S, at least 0.2 wt % and not more than 0.35 wt % of C and, at least 2.2 wt % and not more than 3.6 wt % of Ni.

2. The rolling bearing in accordance with claim 1, containing at least 0.7 wt % and not more than 0.9 wt % of Cr, at least 0.2 wt % and not more than 0.25 wt % of Mo, and not more than 0.015 wt % of P.

3. The rolling bearing in accordance with claim 1, wherein said steel contains at least 0.25 wt % and not more than 0.35 wt % of C and at least 2.2 wt % and not more than 2.9 wt % of Ni.

4. The rolling bearing in accordance with claim 1, containing at least 0.25 wt % and not more than 0.30 wt % of C, at least 2.2 wt % and not more than 2.9 wt % of Ni, at least 0.7 wt % and not more than 0.9 wt % of Cr, at least 0.2 wt % and not more than 0.25 wt % of Mo, at least 0.15 wt % and not more than 0.4 wt % of Si, at least 0.3 wt % and not more than 2.0 wt % of Mn, at least 0.001 wt % and not more than 0.01 wt % of Ti, at least 0.001 wt % and not more than 0.005 wt % of N, not more than 0.015 wt % of P, not more than 0.05 wt % of Cu, not more than 0.01 wt % of Nb and not more than 0.01 wt % of V.

5. The rolling bearing in accordance with claim 1, having core hardness of at least HV 450 and not more than HV 550.

6. The rolling bearing according to claim 1, wherein at least one of said rolling bearing ring and said rolling element consists of carburized or carbonitrided steel consisting of Fe, Cr, Mo, Si, Mn, Ti, S, at least 0.2 wt % and not more than 0.35 wt % of C, at least 2.2 wt % and not more than 3.6 wt % of Ni, not more than 0.015 wt % of P, not more than 0.05 wt % of Cu, not more than 0.01 wt % of Nb, and not more than 0.01 wt % of V.

7. A rolling bearing having a rolling bearing ring and a rolling element, wherein the diameter of said rolling element is at least 20 mm and at least one of said rolling bearing ring and said rolling element consists of carburized or carbonitrided steel consisting essentially of Fe, at least one selected from the group consisting of Cr, Mo, Si, Mn, Ti and S, at least 0.2 wt % and not more than 0.35 wt % of C, and at least 2.2 wt % and not more than 3.6 wt % of Ni.

* * * * *